United States Patent [19]

Beirxe

[11] Patent Number: 4,912,643
[45] Date of Patent: Mar. 27, 1990

[54] POSITION SENSING APPARATUS

[75] Inventor: Terence P. Beirxe, Donegal, Ireland

[73] Assignee: Institute for Industrial Research and Standards, Dublin, Ireland

[21] Appl. No.: 115,759

[22] Filed: Oct. 30, 1987

[30] Foreign Application Priority Data

Oct. 30, 1986 [IE] Ireland .................. 1682/86

[51] Int. Cl.$^4$ ............ G01S 5/16; G01S 1/70
[52] U.S. Cl. ............... 364/449; 37/DIG. 1;
172/4.5; 356/1; 356/4
[58] Field of Search ............ 364/424, 449, 424.01,
364/424.04, 424.06; 356/1, 4; 37/DIG. 1;
172/4.5

[56] References Cited

U.S. PATENT DOCUMENTS

| 3,846,026 | 11/1974 | Waters ............... 356/4 X |
| 3,924,107 | 12/1975 | Sakai ............... 364/424 X |
| 4,029,415 | 6/1977 | Johnson ............... 356/1 X |
| 4,200,787 | 4/1980 | Carson ............... 172/4.5 X |
| 4,677,555 | 6/1987 | Goyet ............... 37/DIG. 1 X |
| 4,688,933 | 8/1987 | Lapeyre ............... 356/1 |
| 4,700,301 | 10/1987 | Dyke ............... 364/424 |

FOREIGN PATENT DOCUMENTS

| 3107674 | 9/1982 | Fed. Rep. of Germany . |
| 0141964 | 9/1984 | Fed. Rep. of Germany . |
| 1181838 | 2/1970 | United Kingdom . |
| 2089615 | 10/1981 | United Kingdom . |
| 2152320 | 12/1984 | United Kingdom . |

OTHER PUBLICATIONS

Vol. 8, No. 48(p-258) (1485). Mar. 3, 1984.
Vol. 10, No. 380(p-528) (2437, Dec. 19, 1986.

Primary Examiner—Eugene R. Laroche
Assistant Examiner—Benny T. Lee
Attorney, Agent, or Firm—Scully, Scott, Murphy & Presser

[57] ABSTRACT

A position sensing apparatus 1 having two base stations spaced-apart a known distance on a datum line L. The base stations each comprise generators 2(a) and 2(b) which emit a rotating laser beam. The rotating laser beams are detected by a movable sensor 6 and datum sensors 7(a), 7(b) which are associated with the generators 2(a), 2(b) and are located on the datum line L. The time difference between detection of each laser beam by the movable and datum sensors 7(a), 7(b) is determined and is used to calculate positional angles $\alpha$ and $\beta$ between position lines between the movable sensor and each base station and the datum line L. As there are only two laser beams, they are differentiated by contra-rotation in the same horizontal plane. Vertical position is determined according to the vertical position on the movable sensor 6 at which the beams are detected. The position and level values may be continuously displayed in a vehicle having a movable sensor and they may be used for automatic control or may be stored for analysis.

14 Claims, 7 Drawing Sheets

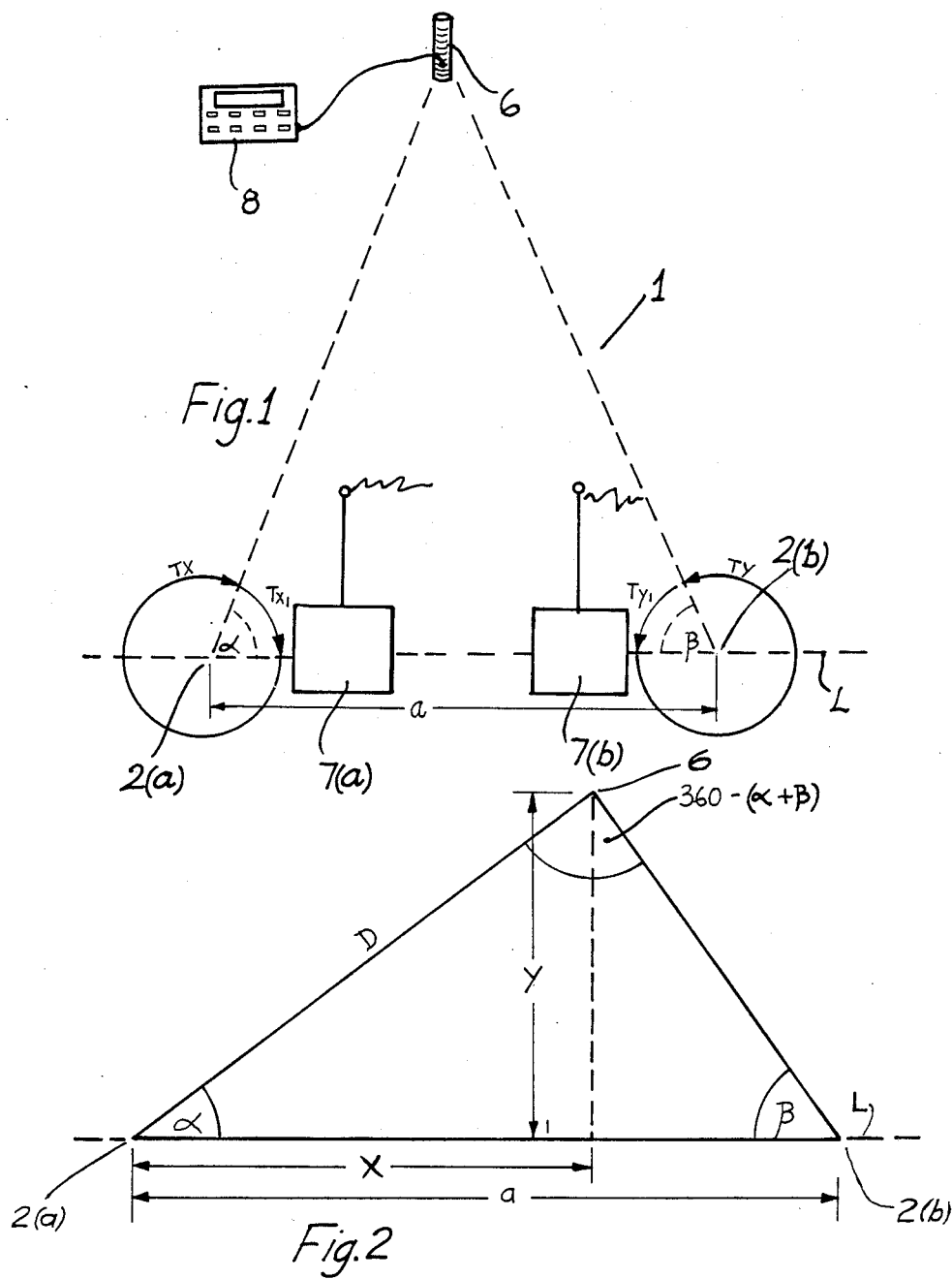

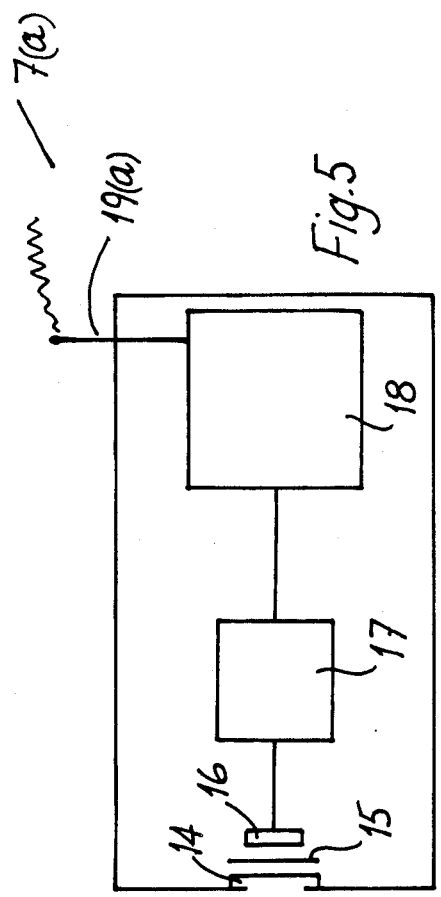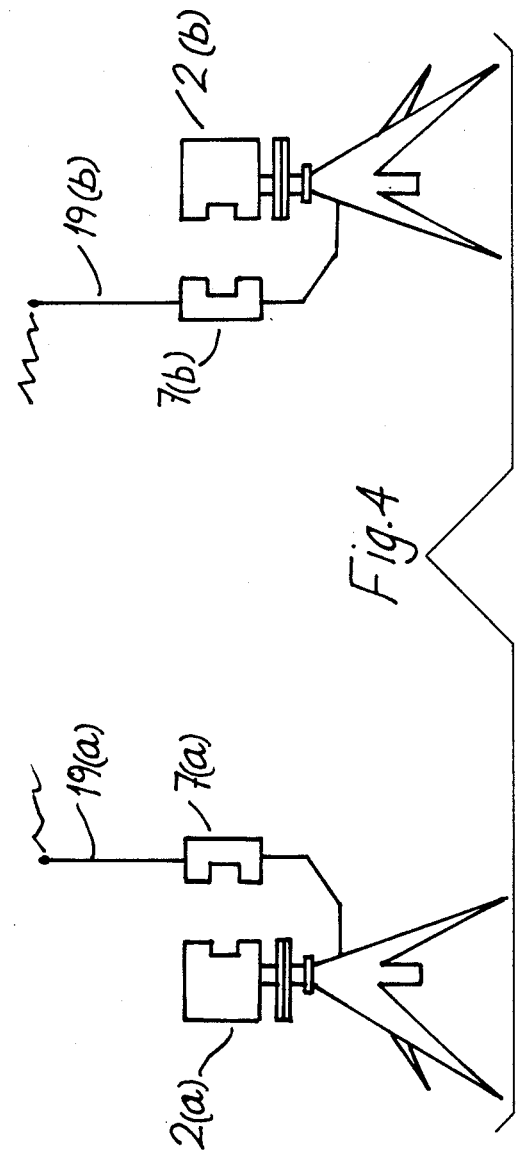

POSITION SENSING APPARATUS

BACKGROUND OF THE INVENTION

1. Introduction

The present invention relates to a method and apparatus for sensing position particularly for use in land surveying and earth moving machinery control.

2. Field of the Invention

It is known to use rotating laser beams for position sensing. For example, U.K. patent application No. 2,152,320 (Siddall) describes a laser measurement system based on at least three rotating laser beams from two base stations which are separated by a known distance. A movable sensor to detect the beams and store the time at which the beams are detected is employed. A datum means is provided by a contra-rotating reference beam from at least one of the generators, and the time at which this reference beam is detected by the movable sensor is stored for comparison. As there are at least three rotating beams, they are rotated on separate, unique planes so that they can be differentiated.

U.K. patent application No. 2,089,615 (Tsumura) describes the use of one or more scanning laser beams in either a horizontal or a vertical plane for defining a path, which a vehicle fitted with a movable sensor is to follow. Position is determined solely with respect to the location on the movable sensor, at which the scanning beam is detected. Vertical position relative to a scanning beam in a horizontal plane may be determined, however, as the range of movement which can be detected is limited to the physical dimensions of the movable sensor, measurement of movement in a horizontal plane may not be measured outside of a pre-determined track, he width of which is determined by these physical dimensions.

OBJECT OF THE INVENTION

The present invention is directed towards providing an improved construction of position sensing apparatus and additionally providing means for controlling earth moving machinery. The invention is further directed towards providing an improved method of sensing position.

SUMMARY OF THE INVENTION

According to the invention, there is provided a position sensing apparatus comprising:

(a) a base station comprising a radiation generator for generating a rotating beam of radiation;

(b) a movable sensor which detects the beam from the radiation generator;

(c) means for determining the positional angle defined between a position line between the movable sensor and the radiation generator an a datum line; and (d) datum means associated with the base station to provide a time datum for comparison with the time at which the movable sensor detects the beam, said datum means comprising a datum sensor for detecting the beam from the radiation generator, and said means for measuring the positional angle comprises timing means for determining the time delay between the receiving of the radiation beam by the datum sensor and the movable sensor.

In another embodiment of the invention, the position sensing apparatus comprises two base stations, each comprising a radiation generator, the generators being spaced-apart a known distance along the datum line and each radiation generator having an associated datum sensor.

In a further embodiment of the invention, the datum sensors are located on the datum line.

In a still further embodiment of the invention, each radiation generator generates a rotating beam of radiation, the beams rotating in a common plane, each at a constant angular velocity and the rotating beams are differentiated.

Ideally, the beams are differentiated by rotating tee beams in opposite directions in a common plane.

Preferably, the radiation beam is a laser beam.

In a preferred embodiment of the invention the or each datum sensor includes a radio transmitter for transmitting a radio signal immediately on detection of a radiation beam from the associated radiation generator, and the movable sensor includes a radio receiver for receiving radio signals transmitted by the datum sensor, the movable sensor includes differentiating means for determining from which radiation generator a radiation beam is emitted and from which datum sensor a radio signal is transmitted, and timing means for determining the time delay between detection of a radiation beam from each radiation generator and reception of a radio signal from the associated datum sensor, the movable sensor further comprising processing means for determining the positional angle defined between position lines between the movable sensor and each radiation generator and the datum line in response to time delay inputs and an input of the distance between the two radiation generators.

In one embodiment of the invention, the radio transmitter of the or each datum sensor is a two-channel radio frequency tone transmitter for operation at the upper level of the VHF band.

In another embodiment of the invention the apparatus includes means for determining the level of the movable sensor.

In this latter embodiment, the level is preferably determined with reference to the datum line.

Ideally, the movable sensor comprises a plurality of vertically spaced-apart radiation detectors, the distance between the radiation detectors and the height of the movable sensor above the ground determining the level of the sensor above the datum line.

In one embodiment, the position sensing apparatus is for use with earth moving machinery.

means for storing a set of preset desired position and level data;

means for comparing the preset data with the determined data to produce a set of control difference data;

means for outputting the control difference data to a driver of an earth moving machine.

In a further embodiment, the position sensing apparatus includes control means which utilises the control and difference data to control an earth moving machine.

In a still further embodiment, the position sensing apparatus includes means for transmitting determined position and level values to a separate memory means.

In another embodiment the position sensing apparatus comprises a display means for outputting determined position and level data.

In a further embodiment, the invention provides a method of determining the position of a movable sensor relative to a datum comprising the steps of:

establishing a datum line between a radiation generator and an associated datum sensor;

generating a rotating beam of radiation from the generator; and monitoring the time delay between the reception of a radiation signal by the datum sensor and by the movable sensor to provide a measure of the positional angle defined between a position line between the movable sensor and the radiation generator and the datum line.

Ideally, the method comprises the additional steps of:

transmitting a radio signal from the datum sensor when a radiation signal is detected; and receiving the radio signal at the movable sensor to determine the time t which a radiation signal is detected at the datum sensor.

ADVANTAGES OF THE INVENTION

One of the most important features of the invention is that the datum sensor dispenses with the need for a reference rotating laser beam and thus only one rotating beam is required at each base station. This greatly simplifies the construction of the apparatus. As the angle between the two position lines and the datum line may be calculated at each radiation generator, it will be appreciated that the position of the movable sensor in a given plane may be continually and accurately measured.

As there are only two rotating radiation beams, they may be easily differentiated by contra-rotation, and therefore, they may be rotated on the same plane. This feature allows level to be measured using a relatively simple construction of movable sensor having vertically spaced-apart radiation detectors.

It will be appreciated that the use of radio transmitters and receivers for enabling the time at which a laser beam is detected by a datum sensor to be stored for comparison allows this to be done accurately and at relatively small expense. Further, radio signals may be differentiated at the movable sensor using known techniques.

It will further be appreciated that as the radio signals and rotating radiation beams may be easily differentiated and the calculations required are relatively simple, the detection and processing circuitry may be contained in the movable sensor, which in effect, acts as the "centre" of the position sensing apparatus. This is a significant advantage as the required positiOn infOrmation can then be transmitted for display i a vehicle on which the movable sensor is mounted. This is very useful for control purposes.

One of the problems with major land excavation and infill is the difficulty in controlling predetermined depths and gradients on the site, whether the site has to be prepared by graders, excavators or any form of earth moving machinery. Ideally, the operator of the earth moving machinery should be given accurate information as to the height over or under datum required at any particular location on the site. Indeed, by doing this, the invention might in many cases obviate the need for a driver by the use of relatively simple control equipment for the earth moving machinery. In any case, such information would greatly reduce the complexity of the task he or she is required to do.

Further, in surveying itself it is advantageous to be able to combine both the position and level functions in the one apparatus without the need as heretofore for two pieces of equipment and thus two separate tasks. By providing for transmission of determined position and levels to a separate memory means the invention allows paths followed by a vehicle having a movable sensor to be stored for analysis. This is particularly useful for land surveying.

The invention will be more clearly understood from the following description of a preferred embodiment thereof given by way of example only with reference to the accompanying drawings in which:

BRIEF DESCRIPTION OF THE DRAWINGS

FIG. 1 is a diagrammatic plan view of the lay-out of a position sensing apparatus according to the invention;

FIG. 2 is a diagram illustrating the lay-out for calculation purposes;

FIG. 4 is a side view of portion of the apparatus;

FIG. 5 is a block diagram illustrating the operation of a portion of the apparatus;

DETAILED DESCRIPTION OF THE INVENTION

Figure 3:
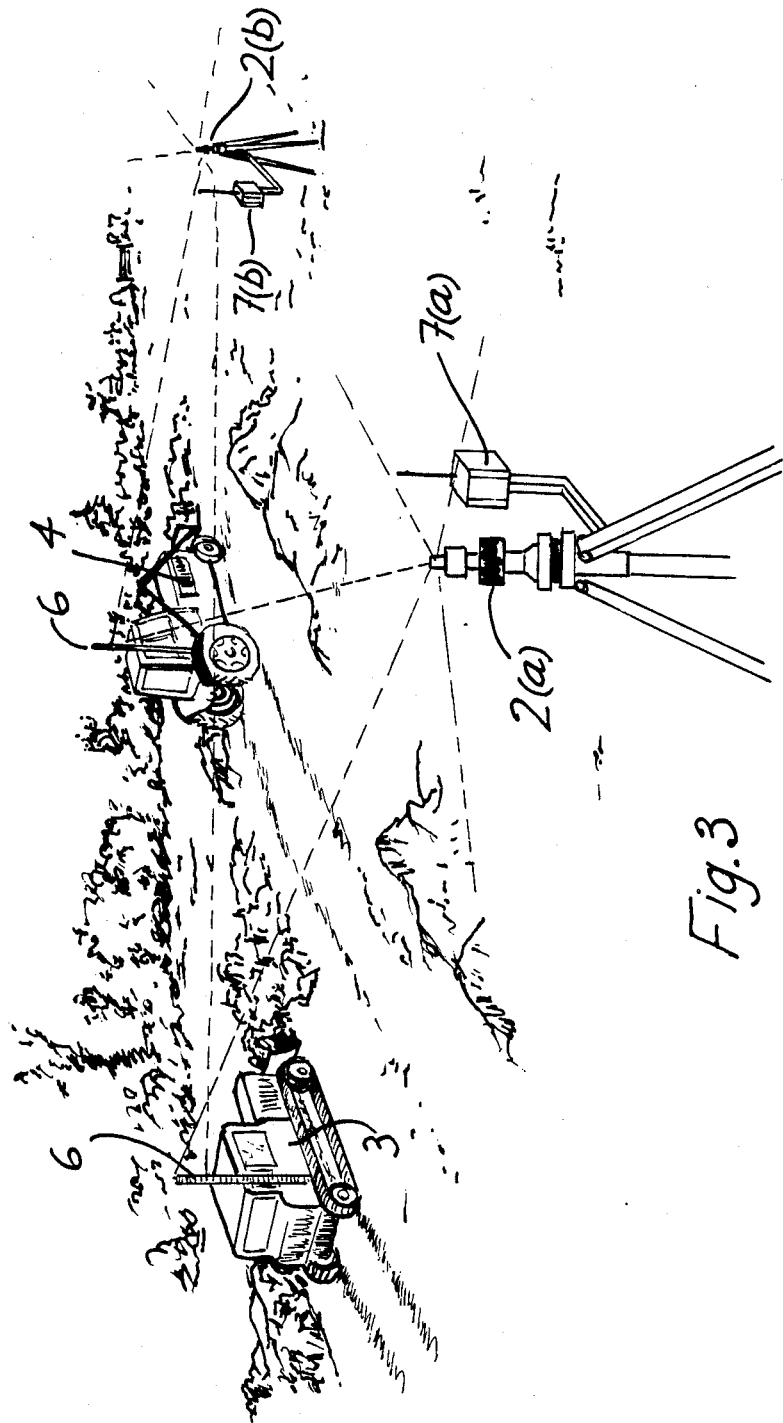
FIG. 3 is a diagrammatic perspective views of the apparatus in use with earth moving machinery.

The present invention provides an apparatus and method for determining the position and level of movable objects such as earth moving machines. To help in understanding the invention the overall lay-out of the position sensing apparatus and its method of operation will be discussed initially with reference to FIGS. 1 to 3. Referring to the drawings and initially to FIGS. 1 and 2, there is illustrated a method of determining the position of a movable sensor 6 forming part of a position sensing apparatus, indicated generally by the reference numeral 1. Two base stations comprising laser generators 2a and 2b each for generating a rotating laser beam are positioned on a datum line L and are spaced-apart a known distance a. Datum radiation sensors 7a and 7b are provided for each generator 2a, 2b and positioned on the datum line L, the datum sensor 7a being associated with the laser generator 2a and the datum sensor 7b being associated with the laser generator 2b. To differentiate the beams the direction of rotation of the laser beams from the laser generators 2a and 2b are opposite, the beam generated by the generator 2a being clockwise and the beam generated by the beam 2b being anti-clockwise. The movable radiation sensor 6 may be secured to a moving object, such as an earth moving machine, the position of which relative to the datum is to be determined.

Considering the operation of the laser generator 2a, as its laser beam rotates, there is a time difference, Tx1 between which the laser beam is detected by the movable sensor 6 and by the datum sensor 7a. When the beam is detected by the datum sensor 7a la radio signal is immediately transmitted by the sensor 7a to be picked up by the movable sensor 6. A further time difference Tx then elapses before the laser beam is again detected by the movable sensor 6. There are similar time differences Ty1 and Ty for the laser generator 2b. Thus the angles $\alpha$ and $\beta$ can both be determined as illustrated in FIG. 2 by the following formulae:

$$\alpha = 360° \cdot \frac{Tx1}{Tx}$$

and $$\beta = 360° \cdot \frac{Ty1}{Ty}$$

The distance between the two laser generators 2a and 2b on the datum line L, namely, the distance "a" is known. From this, as can be seen from FIG. 2 can be calculated the distance, D, of the movable sensor 6 from the laser generator 2a as follows:

$$D = \frac{a \cdot \sin\beta}{\sin(360° - (\alpha + \beta))}$$

To find the X and Y co-ordinates with respect to an origin at the laser generator 2a, the following formulae may be used:

X = D Cos α

Y = D Sin α

The level of the ground at the movable sensor 6 will be obtained by knowing at what vertical position on the movable sensor 6, the laser beams are detected. For example, referring to FIG. 6, if H is the height of the movable sensor 6 above ground and x is the vertical separation of separate radiation detectors on the movable sensor 6, the level Z of the datum line L with respect to the ground at the movable sensor 6 may be determined by the following formula:

$$Z = H + Nx + \frac{Mx}{2};$$

where the laser beam is detected at its' lowermost edge by the Nth separate radiation detector and the beam has a width of Mx.

Referring to FIGS. 3 to 7, the position sensing apparatus is illustrated in more detail. In FIG. 3 the apparatus is illustrated in use with a bulldozer 3 and a grader 4, each of which carries a movable radiation sensor 6. Each of the movable radiation sensors 6 comprises a staff with separate optical sensors. A two channel radio frequency tone receiver is provided for each sensor 6 to receive signals transmitted by radio frequency tone transmitters associated with each datum sensor 7a, 7b. The receiver is connected to a micro-computer located in the earth moving machinery.

Referring to FIGS. 4 and 5, the datum radiation sensors 7(a) and 7(b) are illustrated in more detail. Parts similar to those described with reference to the previous drawings are identified by the same reference numerals. Each datum radiation sensor 7 is mounted on the tripod of its associated laser generator 2(a) or 2(b) so that the datum sensors are on the datum line L, which is preferably horizontal. The radio frequency tone transmitters of the datum radiation sensors 7(a) and 7(b) each have a vertical antenna 19(a) and 19(b) respectively. Referring to FIG. 5 each datum radiation sensor 7(a) and 7(b) includes lenses 14, an optical filter 15 and an optical sensor 16.

The arrangement can be seen from the drawing. There are also pre-amplification and signal conditioning circuits 17 and a 2 channel tone burst VHF transmitter 18.

Figure 6:
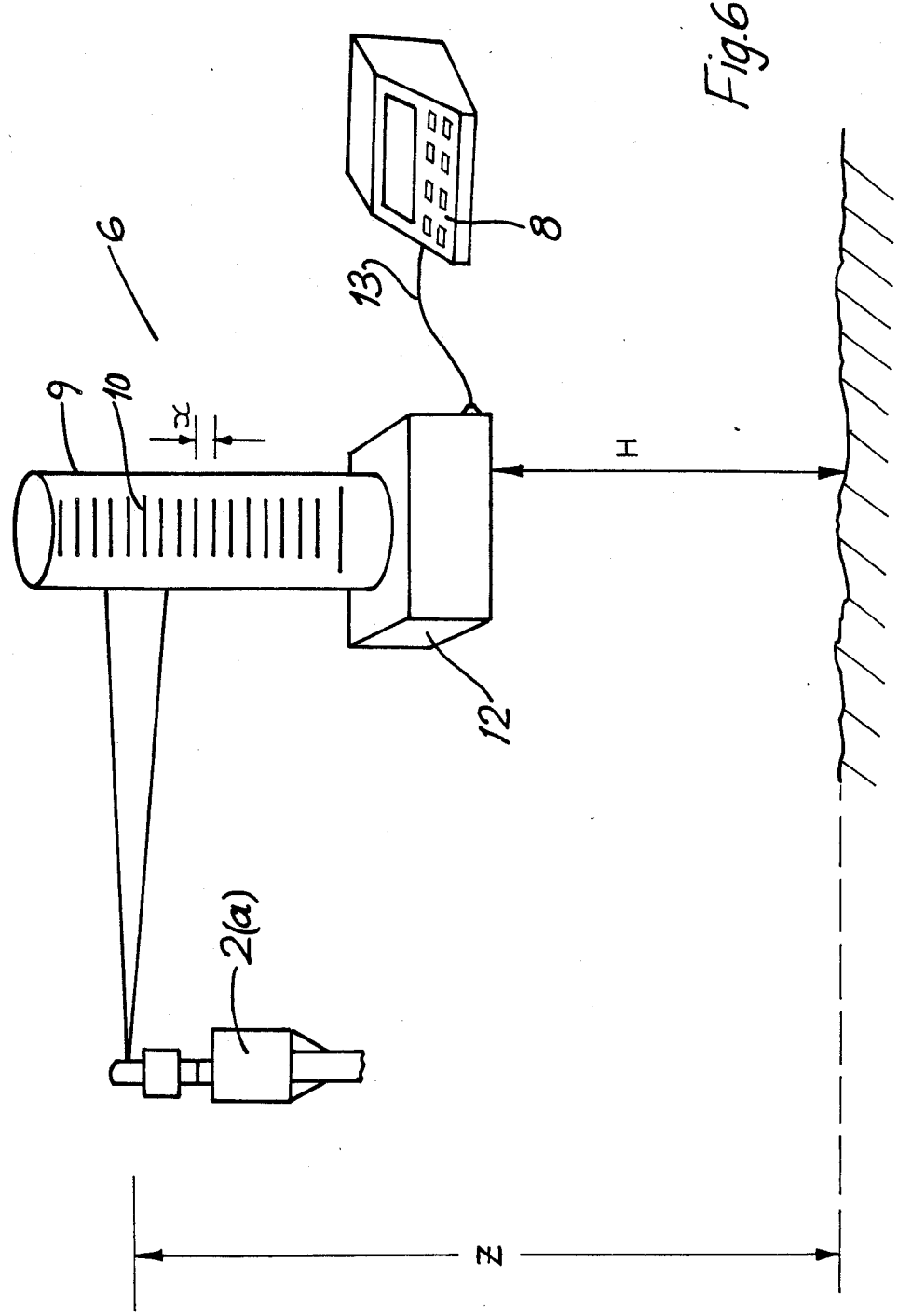
FIG. 6 is a diagrammatic view of a movable radiation sensor according to the invention.
Figure 7:
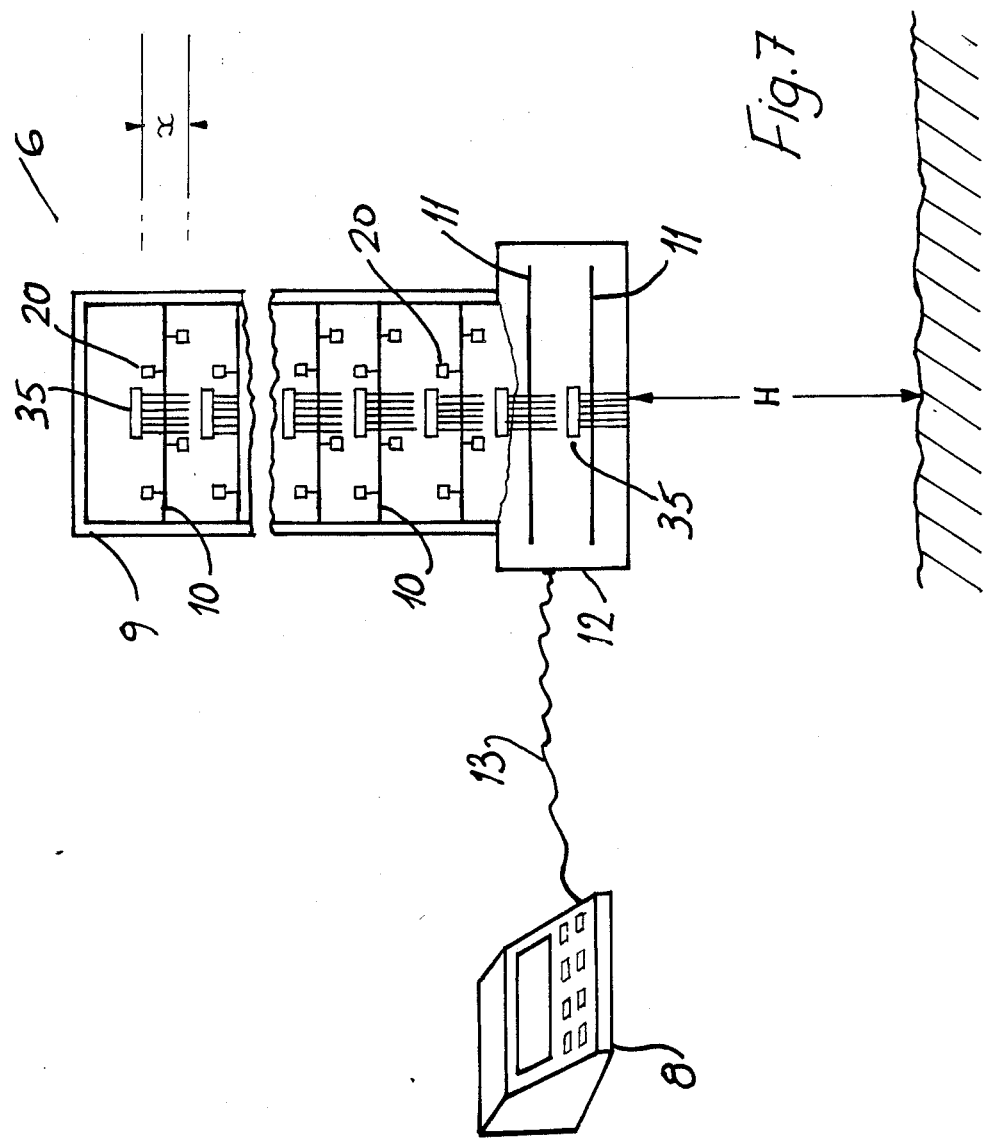
FIG. 7 is a detailed side view of the movable radiation sensor of FIG. 6.

Referring now to FIGS. 6 and 7, one of the movable radiation sensors 6 is illustrated in more detail and parts similar to those described with reference to the previous drawings are identified by the same reference numerals. The movable radiation sensors 6 each comprise a cylindrical lens and filter 9 within which is a stack of vertically spaced-apart circuit boards 10, which include radiation detectors 20, namely, optical sensors and signal conditioning circuits 35. The movable sensor 6 has a base 12 which contains differentiating means, namely, digital circuit boards 11 for decoding the direction of rotation of the radiation beams—in this case the lasers and two separate VHF channel receivers and also custom built processing and timing circuits. The sensor 6 is linked to a micro-computer 8 by a cable 13. The various circuit boards 10 and 11 are connected via wire-wrap sockets 35.

The distance H of the sensor 6 above ground will be known if the sensor 6 is mounted on a conventional staff or fixed to a work machine, or can be measured by means such as an ultrasonic distance meter.

The level Z of the datum line L with respect to the ground at the movable sensor 6 will be given by the formula given above and in FIG. 6 the valve for N is 9 and that for M is 4.

Figure 8:
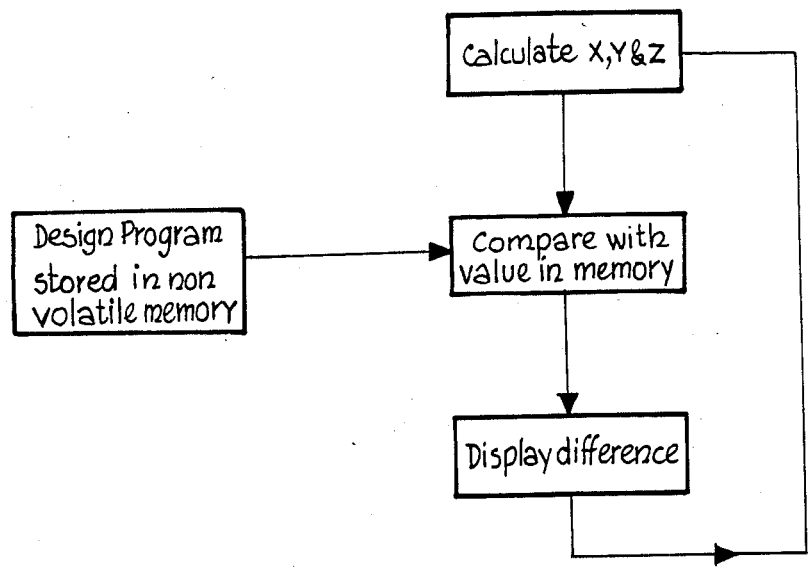
FIG. 8 is a flow diagram illustrating one mode of operation of the apparatus.
Figure 9:
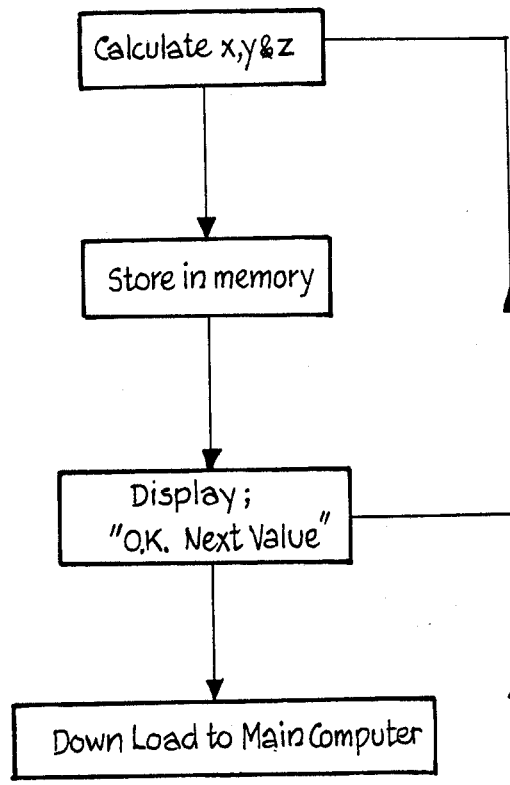
FIG. 9 is a flow diagram illustrating another operation of the apparatus.

Referring now to FIGS. 8 and 9, there are illustrated two different modes of operation of the position sensing apparatus 1. In the mode of FIG. 8, the three parameters X, Y and Z (wherein X and Y are the coordinates at the movable sensor as shown in FIGS. 1 and 2, and Z is the height at a given X, Y location) are determined and continuously compared with pre-set values stored in the electronic circuits of the movable radiation sensor 6. These pre-set values are generally for desired paths, excavation depth etc. A difference signal is continuously outputted to the driver of the earth moving machine on which the movable sensor 6 is located. Thus, the driver is provided with continuous guidance indications.

In the mode of FIG. 9, the position values are continuously transmitted along the cable 13 to the micro-computer 8. When the work is completed, the micro-computer 8 is taken to an office and the position values are downloaded to a computer for analysis. This information will be generally used for graphs of gradients at a site.

It will be noted that the micro-computer 8 is not required for the continuous guidance mode of FIG. 8, as the position values need not be stored for future analysis. A display is merely required.

Figure 10:
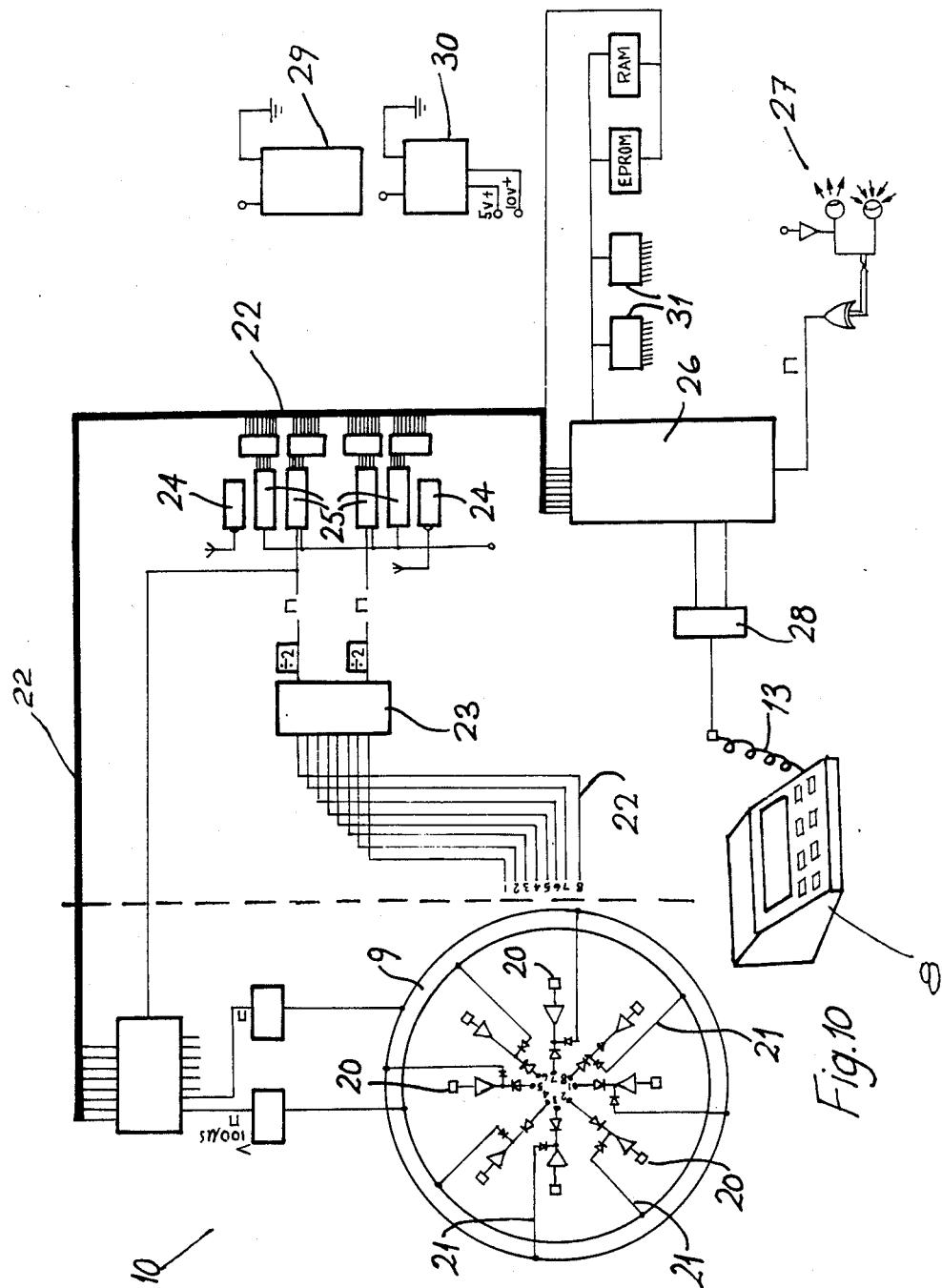
FIG. 10 is a circuit diagram of a portion of the movable radiation sensor of FIG. 6.

Referring now to FIG. 10 the movable sensor 6 is illustrated in more detail, and again parts similar to those described with reference to the previous drawings are identified by the same reference numerals. Each circuit board 10 includes eight optical sensors in the form of pin diodes 20. Surface mounting is preferably used for the components and there are four pin diodes 20 on top of and underneath each board. Radial light guides 21 are provided to optically separate the pin diodes 20, which are positioned in circumferential segments so that effectively eight segments may be "seen" by a laser beam. The circuit boards 10 also contain monostable circuits for transmitting laser detection signals to an 8-bit data bus 22, via a buffer latch. The data bus 22, in turn, inputs these signals to a direction decoder 23, on a circuit board 11, for determining from which laser generator 2(a) or 2(b), the laser beam is emitted. Two RF receivers 24 are provided.

The output of the direction decoder is connected via timing circuits 25 to the data bus 22. The movable radiation sensor 6 further comprises a micro-processor 26 for processing the laser detection signals, and the radio signals to determine the position and level values X, Y and Z. These values are the transmitted via an RS 232 port and line buffers 28 to the on-board micro-computer 8 for storage, as described above. An ultrasonic transducer 27 of conventional construction is also provided for determining the height of the movable radiation sensor 6 above the ground. A power supply 29 with conditioning circuitry 30 is provided. Address decoders 31 are provided for the microprocessor 26.

It will be appreciated that the apparatus 1 enables both position and level parameters to be obtained and thus two separate instruments and methods are not required. Further, because of its simplicity, the apparatus 1 is relatively easy to set up and operate and it is envisaged that an operator will not be required to operate the apparatus once it has been set up.

Indeed, considering the way in which position and level sensing is automated the invention may be considered a radical improvement over known technology, as it provides enormous potential for further automation of excavation and building sites generally. For example, it is envisaged that in the future, drivers for earth moving machinery may not be needed.

Because of the arrangement of the optical sensors on the movable sensor, and the use of distance sensing equipment, particularly ultrasonic equipment for measuring H, the position values provided by the apparatus 1 are extremely accurate, for example, it is envisaged that an accuracy of +/−5 mm will be obtained for the level indications.

It will be appreciated that because two oppositely rotating radiation beams are used, the circuitry and programs required to determine from which laser generator a detected beam is emitted, is extremely simple, reliable and inexpensive.

Although the position sensing apparatus of the invention has been illustrated having two radiation generators, it is envisaged that it may include only one radiation generator and associated datum sensor, which, in use, would determine one positional angle. The position of the movable sensor may then be found by determining the distance between the radiation generator and the movable sensor by using a device such as a distance measuring device using modulated light beams. Such a distance measuring device may be used in combination with an electronic theodolite.

I claim:

1. A position sensing apparatus comprising:
   a. first and second base stations, each base station comprising a radiation generator for generating a rotating beam of radiation in a common plane at a constant angular velocity and in an opposite direction relative to the other base station, and in which the radiation generators are spaced apart a known distance along a datum line;
   b. a separate datum sensor associated with each radiation generator for detecting the beam of radiation generated by its associated radiation generator and generating a timing signal indicative thereof; and
   c. A movable sensor for detecting each rotating beam of radiation, timing means at the movable sensor and coupled thereto, said timing means being responsive to the timing signals generated by the datum sensors of the first and second base stations, for determining positional angles defined between position lines between the movable sensor and each radiation generator and relating to the datum line by determining the time delays between the receiving of each radiation beam by its datum sensor and by the movable sensor.

2. A position sensing apparatus as recited in claim 1, in which the datum sensors are located on the datum line.

3. A position sensing apparatus as recited in claim 1 or 2, further including:
   a. a separate radio transmitter at each datum sensor for transmitting a radio signal immediately upon detection of a radiation beam from the associated radiation generator;
   b. a radio receiver at the movable sensor for receiving radio signals transmitted by the datum sensors;
   c. differentiating means at the movable sensor for differentiating which datum sensor is transmitting a radio signal;
   d. means for determining the time delay between detection of a radiation beam from each radiation generator and reception of a radio signal from the associated datum sensor; and
   e. means for calculating the positional angles in response to the time delays and the distance between the two radiation generators.

4. A position sensing apparatus as recited in claim 3, in which each datum sensor is positioned in a separate housing and each is mounted on a radiation generator.

5. A position sensing apparatus as recited in claim 3, in which the radio transmitter of each datum sensor is a two channel radio frequency tone transmitter operating at an upper frequency in the VHF band.

6. A position sensing apparatus as recited in claim 1, in which the apparatus includes means for determining the vertical position of the movable sensor with reference to the datum line.

7. A position sensing apparatus as recited in claim 6, in which the movable sensor is positioned above ground and comprises a plurality of vertically spaced apart radiation detectors, with the vertical distance between the radiation detectors and the vertical distance of the movable sensor above the ground determining the vertical position level of the movable sensor above the datum line.

8. A position sensing apparatus as recited in claim 7, in which the movable sensor further comprises an ultrasonic transducer for measuring the vertical position of the movable sensor above the ground.

9. A position sensing apparatus as recited in claim 1, in which the apparatus includes:
   a. means for storing a set of preset desired movable sensor position data entered by a user of the apparatus;
   b. means for determining position data on the movable sensor according to said determined position angles;
   c. means for comparing the preset data with the position data on the movable sensor to produce a set of control difference data; and
   d. means for outputting the control difference data to a driver of an earth moving machine.

10. A position sensing apparatus as recited in claim 9, in which the apparatus includes control means for utilizing the control difference data to control and position said earth moving machine.

11. A position sensing apparatus as recited in claim 9 or 10, in which the apparatus includes means for transmitting the position data on the movable sensor to a separate memory means.

12. A position sensing apparatus as recited in claim 9 or 10, in which the apparatus comprises display means for outputting the position data on the movable sensor.

13. A method of determining the position of a movable sensor relative to a datum line comprising the steps of:
   a. establishing the datum line between a pair of radiation generators, each having an associated datum sensor sensing the radiation beam generated by its associated radiation generator and producing a timing signal indicative thereof;
   b. generating a separate radiation beam of radiation from each generator at a constant angular velocity in a common plane and with each radiation beam being generated in an opposite direction of rotation relative to the other radiation beam;
   c. detecting each radiation beam at the movable sensor, and differentiating the radiation beams at the movable sensor by detecting their directions of rotation; and
   d. at the movable sensor, monitoring the time delays between the reception of a radiation signal by each datum sensor as indicated by the timing signals therefrom and detection of each radiation beam by the movable sensor to provide a measure of the positional angle defined between position lines between the movable sensor, and each radiation generator and relative to the datum line.

14. A method as recited in claim 13, comprising the additional steps of:
   a. transmitting a radio signal from each datum sensor when a radiation signal is detected; and
   b. receiving the radio signal at the movable sensor to determine the time at which a radiation signal is detected at the datum sensor.

* * * * *

UNITED STATES PATENT AND TRADEMARK OFFICE
CERTIFICATE OF CORRECTION

PATENT NO. : 4,912,643

DATED : March 27, 1990

INVENTOR(S) : Terence Paul Beirne

It is certified that error appears in the above-identified patent and that said Letters Patent is hereby corrected as shown below:

On the Title page, Section [19]: "Beirxe" should read as --Beirne--

On the Title page, Section [75]: "Beirxe" should read as --Beirne--

Column 1, line 35: "he" should read as --the--

Column 2, line 10: "tee" should read as --the--

Column 4, line 61: "la" should read as --a--

Column 8, line 5, Claim 1: "relating" should read as --relative--

Column 9, line 16, Claim 13: "sensor sensing" should read as --sensor for sensing--

Signed and Sealed this

Fifth Day of November, 1991

*Attest:*

HARRY F. MANBECK, JR.

*Attesting Officer*   *Commissioner of Patents and Trademarks*